United States Patent [19]

Weinkle et al.

[11] Patent Number: 4,791,861
[45] Date of Patent: Dec. 20, 1988

[54] PIZZA STORAGE AND BAKE UNIT

[75] Inventors: Steven G. Weinkle, Miami; Louis A. Weinkle, Coral Gables, both of Fla.

[73] Assignee: Pizza Enterprises, Inc., Coral Gables, Fla.

[21] Appl. No.: 11,626

[22] Filed: Feb. 6, 1987

[51] Int. Cl.$^4$ .............................................. A21B 1/00
[52] U.S. Cl. ..................................... 99/357; 62/331; 99/467; 99/484; 126/19 R; 165/138; 312/237
[58] Field of Search .................. 99/483, 484, 335, 386, 99/401, 447, 467, 474, 476, 339; 126/21 A, 19 R, 273 R, 337 R; 165/138; 219/10.55 E; 312/237; 62/331

[56] References Cited

U.S. PATENT DOCUMENTS

| | | | |
|---|---|---|---|
| T973,013 | 8/1978 | Ferrara et al. | 219/10.55 E |
| 3,884,213 | 5/1975 | Smith | 99/339 |
| 4,156,454 | 5/1979 | Skala | 99/326 X |
| 4,377,109 | 3/1983 | Brown et al. | 99/447 X |
| 4,506,652 | 3/1985 | Baker et al. | 99/423 X |

Primary Examiner—Timothy F. Simone
Attorney, Agent, or Firm—Richard M. Saccocio

[57] ABSTRACT

A compact pizza storage and bake unit which takes up a maximum of twenty inches wide on a counter space, eighteen inches deep, and thirty-one inches high. This unit carries in its lower portion at least ten refrigerated or frozen pizza crusts and ingredients for the pizza including sauce, cheese packets adequately proportioned for the amount required, and garnishing such as pepperoni, onions, mushrooms, capers and the like. The oven is the top half and separated entirely from the bottom half refrigeration area by dead air space and the compressor area. A blower is provided adjacent the compressor to accomplish the twofold purpose of evacuating the dead air space between the oven and refrigerator to prevent undesirable transfer of heat to the refrigerator, and at the same time to accelerate the cooling through the condenser refrigeration coils mounted in the rear portion of the unit. The sidewalls of the frame are lowered adjacent the dead air space with the blower directly covering one. Desirably upper and lower baking decks in the oven portion convert it to an upper oven and lower oven to accomplish baking two pizzas at a time. Both the oven door and the refrigerator door pivot along a horizontal lower axis, thereby permitting both to be used as trays for makeup and removal of the pizza.

4 Claims, 3 Drawing Sheets

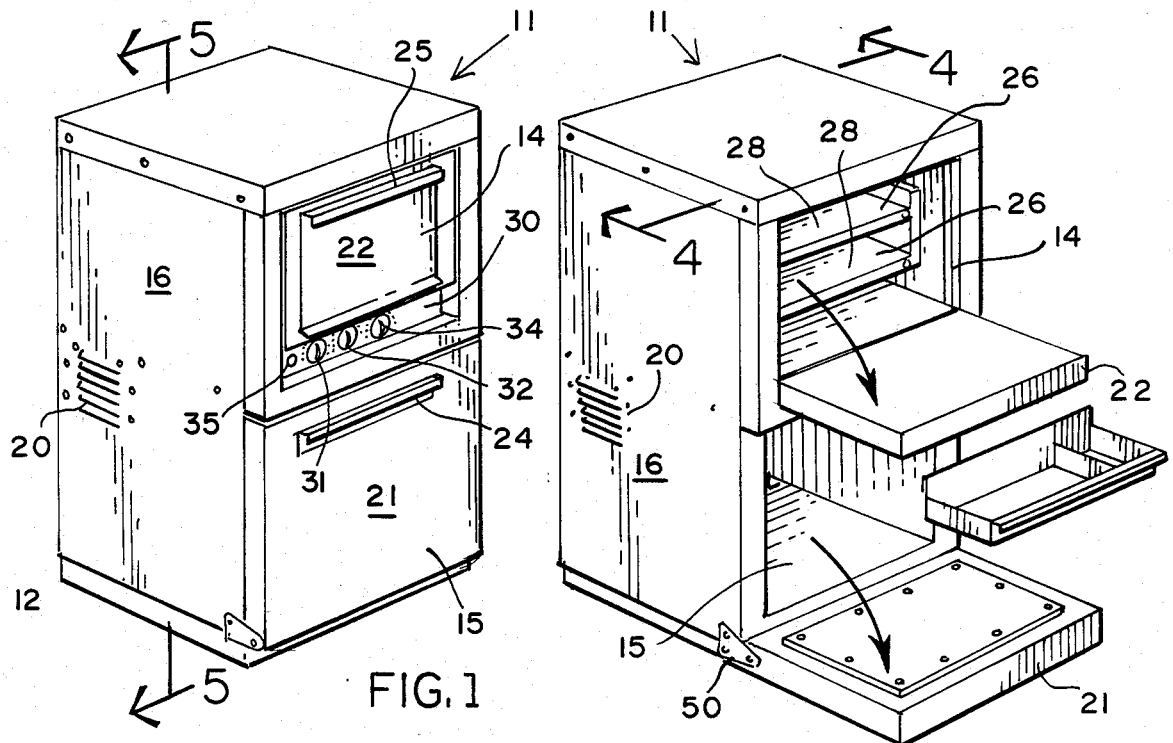
FIG. 1
FIG. 2
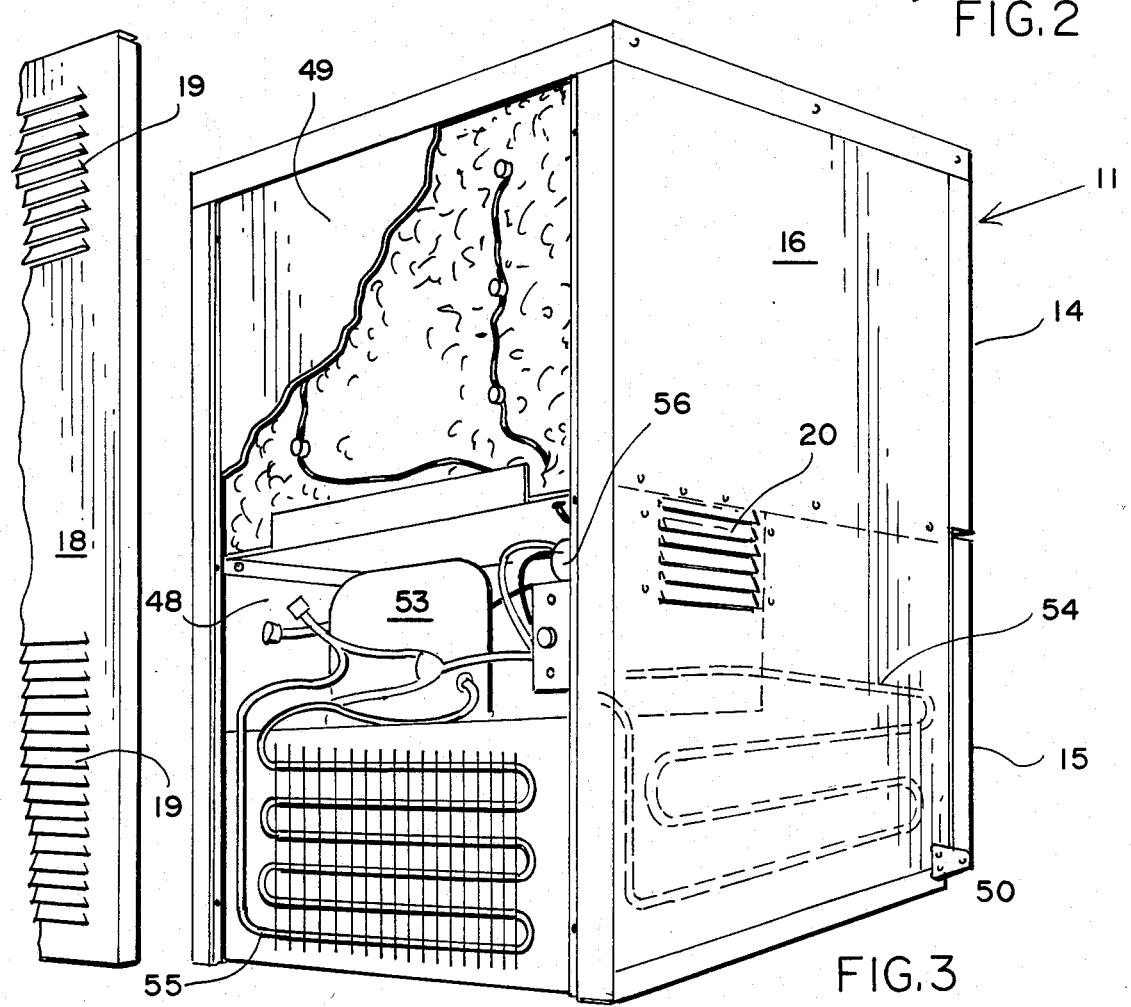
FIG. 3

PIZZA STORAGE AND BAKE UNIT

BACKGROUND OF THE INVENTION

1. Field of the Invention

The present invention relates to a combination unit for the refrigerated or frozen storage of pizza components and an adjacent oven for baking such pizzas mounted atop the refrigeration unit.

2. Summary of the Prior Art

Pizzas have been baked and relished by gourmets and fast-food fans throughout major portions of the world. The pizza pie has become as American as the hamburger, hotdog, and the sandwich. Pizzas are traditionally baked in large ovens, normally at a temperature approximating 500° F. The dough is individually rolled, and often hand spun until it is ready for baking. Thereafter it is placed atop a separate tray, and the covering of tomato sauce, cheese, and the balance of the ingredients is applied. Thereafter, the tray upon which the pizza sits is placed into an oven, and it is baked for twenty-five to thirty minutes at 450° F. to 525° F. The process of making a fresh pizza takes as long as one-half an hour, even where the best skills are applied. Pizza parlors require considerable space, substantial equipment and installations, and support facilities.

SUMMARY OF THE INVENTION

The present invention is directed to a compact pizza storage and bake unit which takes up a maximum of twenty inches wide on a counter space, eighteen inches deep, and thirty-one inches high. This unit carries in its lower portion at least ten refrigerated or frozen pizza crusts and ingredients for the pizza including sauce, cheese packets adequately proportioned for the amount required, and garnishing such as pepperoni, onions, mushrooms, capers and the like. The oven is the top half and separated entirely from the bottom half refrigeration area by dead air space and the compressor area. A blower is provided adjacent the compressor to accomplish the twofold purpose of evacuating the dead air space between the oven and refrigerator to prevent undesirable transfer of heat to the refrigerator, and at the same time to accelerate the cooling through the condenser refrigeration coils mounted in the rear portion of the unit. The sidewalls of the frame are lowered adjacent the dead air space with the blower directly covering one. Desirably upper and lower baking decks in the oven portion convert it to an upper oven and lower oven to accomplish baking two pizzas at a time. Both the oven door and the refrigerator door pivot along a horizontal lower axis, thereby permitting both to be used as trays for makeup and removal of the pizza.

It is, therefore, a principle object of the present invention to develop a combination pizza unit including an oven at the upper portion and refrigeration unit at the lower portion which take up a minimum of counter space, and literally convert a service station, convenience food store, theater lobby, and other places where the public gathers into a fastfood pizza parlor.

A further object of the present invention is to develop a pizza refrigeration unit which has sufficient capacity for the operator to make pizzas steadily for almost one hour prior to requiring replacement supplies of pizza crusts, tomato sauce, cheese, and garnishing materials.

Yet another object of the present invention is to provide such a pizza refrigeration and oven unit which is relatively inexpensive to manufacture, consumes a minimum amount of power, and requires little if no support systems based upon the use of previously preformed pizza crusts, and prepackaging of the pizza contents in measured proportion to the quantity of pizza contained in the refrigerator and intended for ultimate baking.

BRIEF DESCRIPTION OF THE DRAWINGS

Further objects and advantages of the present invention will become apparent as the following description proceeds, taken in conjunction with the accompanying illustrative drawings, in which:

FIG. 1 is a perspective view of a front portion of the combination pizza unit;

FIG. 2 is a view taken from the same vantage point of FIG. 1 but showing the oven drawer and the refrigeration unit drawer in the open configuration, and positioning the tournament tray immediately adjacent the pizza oven portion;

FIG. 3 is an enlarged rear perspective showing the rear panel and back plate removed, and illustrating the positioning of the refrigeration unit, the refrigeration coils, and the ventilation of the same;

DESCRIPTION OF PREFERRED EMBODIMENTS

Figure 5:
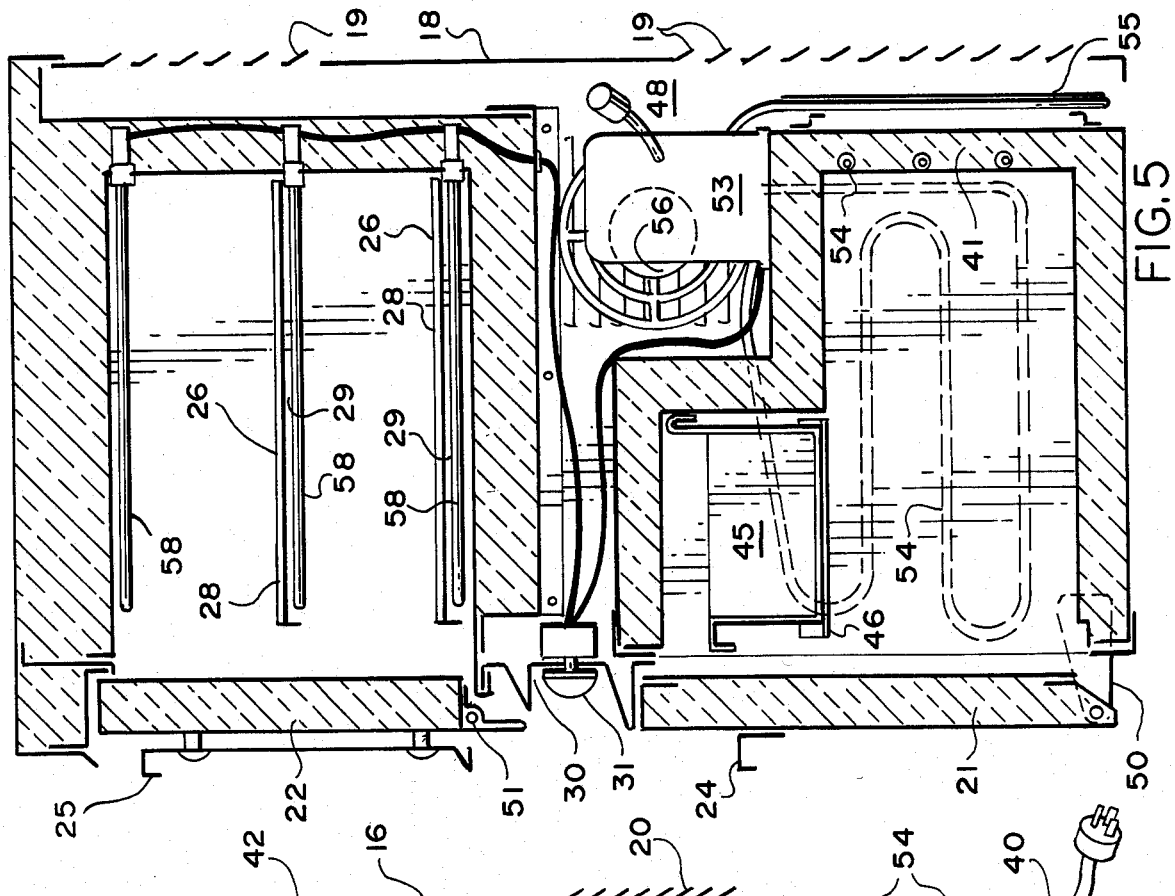
FIG. 5 is another transverse sectional view along the same vantage point, but taken at a different location at 5—5 of FIG. 1 and showing the compressor unit, the ventilation, and the heating elements.

Shown in FIGS. 1-3 are the combination unit 11 which is surrounded by a frame 12. Desirably the upper portion contains an oven 14, and the lower portion has a cooler freezer 15.

The frame has opposed parallel sidewalls 16, and a rear panel 18. The rear panel 18 is provided with four rear louvres 19, located parallel to each other and directly above and below each other. The sidewalls 16 have side louvres 20 which are positioned adjacent the area separating the oven 14 from the cooler freezer 15.

The refrigerator freezer door 21 is hinged at its lower portion to open and serve as a tray. The oven door 22 is similarly hinged at its lower portion, to permit staging the pizza in its flat configuration prior to insertion for baking, or after removal. The refrigerator freezer handle 24 is horizontal and runs substantially the entire length of the door. The oven handle 25 similarly runs approximately the entire horizontal length of the oven. Interiorly of the oven are removable bake trays 28 which, together with the tray slots 29, comprise the baking deck 26.

Separating the oven 14 and the cooler freezer 15 in the front of the unit is a control panel 30. The control panel 30 contains a thermostat 31 for setting the temperature of the oven, and timers 32, 34 for timing the baking cycle of two pizzas, one on each of the baking decks 26. An activate light 35 is also positioned to turn on when the preset temperature has been reached.

Figure 4:
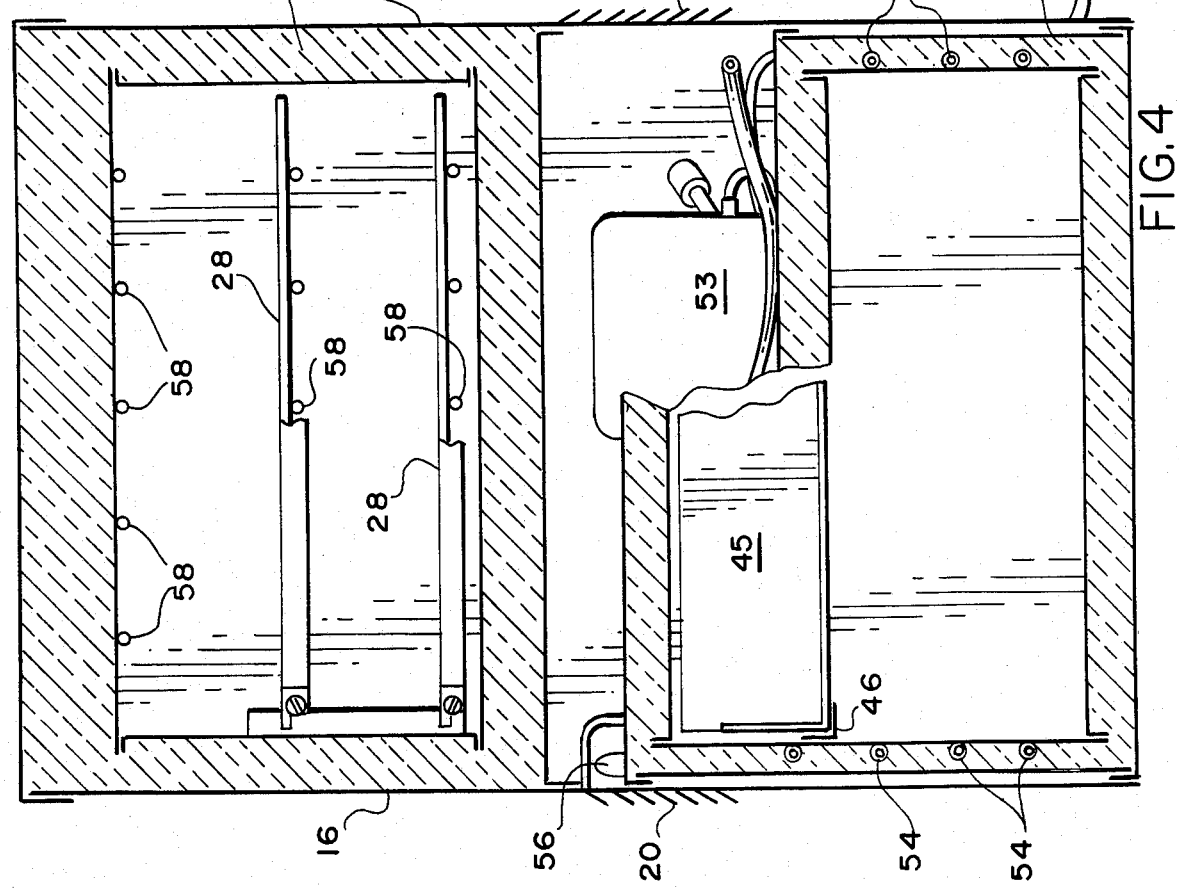
FIG. 4 is a sectional view taken longitudinally front to rear and looking toward the side essentially along section lines 4—4 of FIG. 2.
Figure 6:
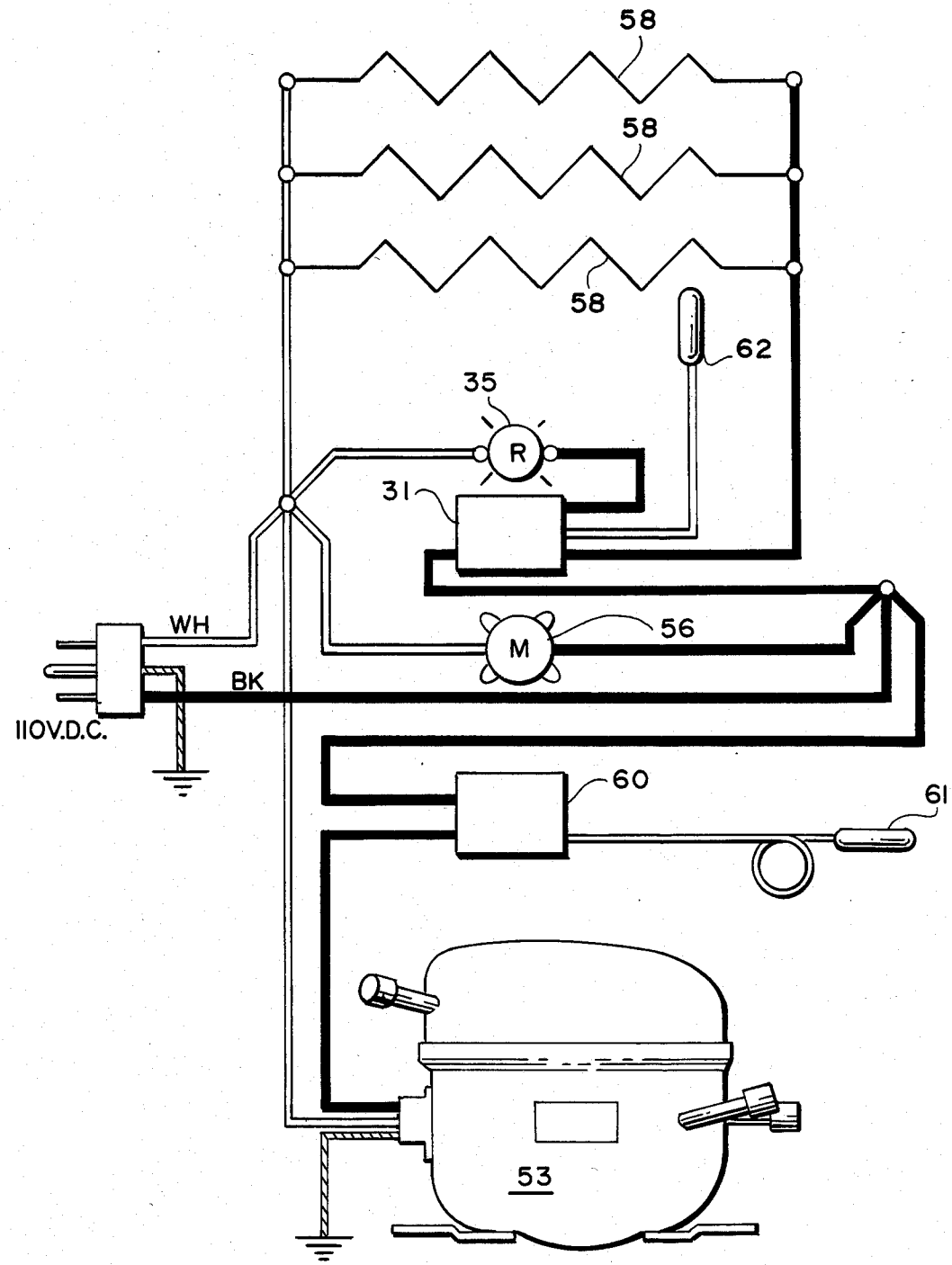
FIG. 6 is an electrical sketch diagram showing the relationship between the electrical controls, the refrigerator, and the oven.

Turning now to FIGS. 4-6, it will be seen that the refrigerator freezer insulation 40 is a foamed in place urethane positioned in place between the interior wall of the refrigerator freezer and the side panels. The back insulation 41 is loosely paccked, as is a good portion of the side insulation 42 adjacent the oven 14. Noting now the configuration in FIG. 4 it will be seen that the refrigerator freezer tray 45 is provided at its upper portion and it slidably engages with a tray mount shelf 46.

As set forth above, the refrigerator freezer door hinge 50 and the oven door hinge 51 provide for both to swing along a horizontal axis and downwardly to provide a tray. Desirably the oven door in particular will be spring loaded to avoid dropping the same.

The cooler coils 54 for the refrigerator cycle are positioned in the rear wall of the lower portion of the unit, and adjacent the lower two rear louvres 19 of the rear panel 18. A condenser 55 is positioned in a well at the rear portion of the upper portion of the refrigerator freezer 15. A blower 56 is provided in the recessed condenser area and exhaust directly to one of the side louvres 20 of the sidewalls 16. Optionally a second blower can be employed, but practical experience has indicated that one is sufficient. The advantage of the blower and its positioning in the chamber of the dead air is that it accomplishes a multiple function. It exhausts air from the dead air space between the oven 14 and the refrigerator freezer 15 thereby minimizing heat transfer. In addition the blower causes air to come in through the lower rear louvres of the rear panel 18 and circulate over the cooler coils 54. Furthermore, it will remove any fumes which do gather in the dead air space and since the louvres are all directed downwardly, whatever odors or even particulate material are involved they will be deflected towards the floor of the area where the unit is kept.

Finally, it will be seen that under each of the baking decks 26 a serpentine calrod heater element 58 is positioned. Two such electric calrod serpentine heater units 58 are disclosed. Each of the calrod serpentine heater elements 58 is activated by one of the thermostat 31 so that the temperature is substantially uniform and the radiant heat is substantially uniform beneath each of the baking deks 26. Therefore, the two baking deck 26 areas are sandwiched between the calrods 58 and will have substantially the same baking effect on the pizza, and can be uniformly timed. Normally the cycle is between four and six minutes, and the temperature approximates 500° F. The time temperature relationship as to baking pizza obtains thus when the temperature is increased slightly the time can be reduced. Insome instances where a softer crust is desired, the temperature is lowered and the time extended.

Additional details of the construction include the provision of the recess 48 in the rear portion of the refrigeration cooler freezer 15 to house the blower 56, and the condenser 55. Also provision is made for a rear panel inner cover 49 as best shown in FIG. 5 to overlay the circuitry leading to the serpentine calrods 58.

The electrical circuitry is best shown in FIG. 6. There it will be seen that contact is made with 110 volts alternating current. The thermostat 31 is connected to a thermostat probe 62 interiorly of the oven 14. The thermostat 31 can be set to any given temperature. The pilot light or activate light 35 is coupled to the thermostat and lights when the preselected temperature is achieved. Also there is a refrigerator control 60 provided in the side of the unit which normally is not adjustable by the operators. It is coupled to the refrigerator freezer probe 61, and therefore will maintain the unit at whatever temperature is preselected.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification, and the appended claims.

What is claimed is:

1. A combination pizza oven and refrigeration storage unit comprising, in combination, a housing having a pair of sidewalls, a rear wall, a top and a bottom, a pizza oven proportioned to fit within an upper portion of said housing, said pizza oven having a door at a front portion, said pizza door being hinged at a lower portion to drop down and stop means for securing the said pizza door, a refrigeration unit at a lower portion of said housing, said refrigeration unit having a forward sealed door, said door being pivoted along a horizontal axis, said horizontal axis being positioned at a lower portion of the refrigeration door to open forwardly and downwardly to thereby become a work tray, a dead air space between the oven unit and the refrigeration unit, said dead air space having a recess entering into and reducing the effective rear portion of the refrigerator in a recessed area, refrigeration condenser coils positioned along the rear wall and opposed to the refrigerator, and insulation means on all walls to thereby refrigerate the unit and heat the unit in insulated relationship each to the other, and a refrigeration compressor is positioned in the oven and the refrigerator unit to thereby maximize the dead air space between the two thermally distinct refrigerator and oven units.

2. In the pizza unit of claim 1 above, a blower provided in the space occupied by the compressor, said blower being directed through a louvred passageway to discharge to the rear along the sides of the respective sidewalls and rear wall of the pizza refrigeration unit to thereby further retain the thermal differential between the oven and the refrigerator to a minimum at the interface of the refrigerator and the oven.

3. In the pizza unit of claim 1 above, a condiment tray slidably secured in the upper portion of the refrigerator unit, a sauce tray positioned adjacent one sidewall of the refrigerator, and means for securing cheese packets on the top portion of the refrigerator unit in opposed relationship to the condiment tray, thereby leaving a space beneath the packaged hanging portion, and the adjacent sauce portion, for the positioning of a plurality of pizza crusts ready for being filled and baked.

4. In the pizza unit of claim 1 above, a pluraliity of controls for timing the oven, and controlling its temperature, and the temperature of the refrigerator, said controls all being positioned laterally at said front portion of the unit and between the oven portion and the refrigerator portion.

* * * * *